Figure 1:
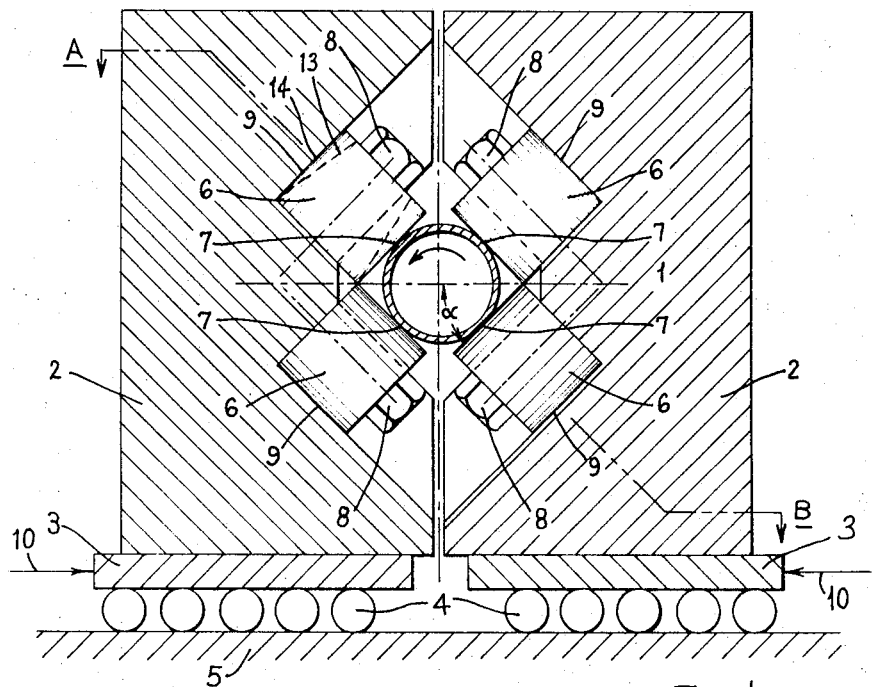

United States Patent [19]
Thamasett

[11] 3,802,240
[45] Apr. 9, 1974

[54] DEVICE FOR THE CONICAL TAPERING OF CIRCULAR CROSS SECTIONED ELONGATED WORKPIECES

[75] Inventor: Eberhard Thamasett, Reutti, Germany

[73] Assignee: Wieland-Werke AG, Ulm, Germany

[22] Filed: Apr. 6, 1973

[21] Appl. No.: 348,708

[30] Foreign Application Priority Data
Apr. 12, 1972  Germany............................ 2217441

[52] U.S. Cl...................................... 72/87, 72/121
[51] Int. Cl............................................ B21d 22/18
[58] Field of Search............... 72/77, 78, 83, 87, 96, 72/100, 121, 84

[56] References Cited
UNITED STATES PATENTS

| 331,574 | 12/1885 | Tasker.................................... 72/96 |
| 3,240,045 | 3/1966 | Sellars et al. ......................... 72/205 |
| 3,517,534 | 6/1970 | Werner et al........................... 72/83 |
| 3,643,485 | 2/1972 | Marcovitch............................. 72/87 |

FOREIGN PATENTS OR APPLICATIONS

| 1,285,433 | 12/1968 | Germany................................ 72/87 |

Primary Examiner—Richard J. Herbst
Attorney, Agent, or Firm—Woodhams, Blanchard & Flynn

[57] ABSTRACT

A device for the conical tapering of a continuously rotating elongated workpiece rotatable about its longitudinal axis and having a circular cross section. The device has at least two radially feedable tools simultaneously advanced in axial direction and arranged in one plane at a right angle to the workpiece axis. At least one of the tools consists of two working surfaces which are fixedly connected with one another and define an acute angle with the radial infeed direction of the tools. The two working surfaces are each formed by a surface of a disk which is circular in cross section and both disks are secured stationarily and nonmovably on a tool holder in such a manner that the axes of both disks lie in a plane which is at a right angle to the workpiece axis. The intersection of this plane with the surface of each disk defines a line the angle of inclination of which is the angle of the working surface with respect to the infeed direction of the tool.

6 Claims, 2 Drawing Figures

PATENTED APR 9 1974  3,802,240

DEVICE FOR THE CONICAL TAPERING OF CIRCULAR CROSS SECTIONED ELONGATED WORKPIECES

The invention relates to a device for the conical tapering of a continuously rotating elongated workpiece having a circular cross section, the workpiece being rotatable about the longitudinal axis thereof. The device has at least two radially feedable tools simultaneously advanced in the axial direction and are arranged in one plane at a right angle to the workpiece axis. At least one of the tools consists of two fixedly connected working surfaces which define an angle with the infeed direction of the tools.

In a device of this type, which device is known from German Pat. No. 1,285,433, each of the two tools is formed by two such working surfaces so that the known device has altogether four working surfaces. However, principally, it is also possible to work with altogether only three such working surfaces two of which are formed by the one tool and the third one by the other tool. The invention includes both described cases.

In each case, it is required that the force engaging points of all working surfaces on the workpiece lie as close as possible to one common plane perpendicular to the workpiece axis and be equally spaced from each other. This requires correspondingly exact machining of the working surfaces during the manufacture of the tools. In the known device (German Pat. No. 1,283,433) the tools are constructed as plates into which the respective two working surfaces are directly worked. Since the workpiece diameter is not steplike but gradually reduced in the zone of the working surfaces, the working surfaces must be sloped in the direction of the workpiece axis and must be rounded off at its point forming the most narrow passageway for the workpiece. The exact manufacture of these working surfaces is extremely difficult especially since hard metal must be used as the tool material in order to keep the tool wear at a minimum.

The basic purpose of the invention is to construct a device of the type mentioned above so that the difficulty of precisely machining the working surfaces of the tool is minimized.

This purpose is attained according to the invention in such a manner that the two working surfaces are each formed by the surface of a disk which is circular in cross section and both disks are secured stationarily and nonmovably on a tool holder in such a manner that the axes of both disks lie in a plane which is at a right angle to the workpiece axis, whereby from the respective inclination of the intersection of this plane with the surface of each disk results the angle of the working surface with respect to the infeed direction of the tool.

The diameter of such circular disks can be machined very precisely with little expense and can be secured in a correspondingly exact position on the tool holder so that as a result the even support of the workpiece at the force engaging points of the working surfaces meets very high requirements. The radius of the disks fulfills at the same time the two requirements of a gradual wearing in and rounding off of each working surface at the point of the most narrow passageway. The length of the deformation zone, namely the workpiece zone, depends on the diameter of the disks, over which zone the reduction of the workpiece diameter takes place in axial direction from the original value to the desired reduced value. Moreover, the disks can be exchanged quickly and simply on the tool holder.

Generally, two disks arranged in the described manner will be provided on both tools for forming the working surfaces, thus the operation will be carried out like in the known device (German Pat. No. 1,285,433) with a total of four working surfaces. If the operation is carried out with only three such working surfaces, one of the two tool holders has then only one working surface and it is desirable to form this working surface just like the two working surfaces on the other tool holder.

The disks have advantageously a cylindrical shape of the same diameter. In this case, its manufacture with very small diameter tolerances is possible in a particular simple manner by grinding all disks together while arranged axially side-by-side in a row. However, the disks may also have the shape of a truncated cone. Such disks offer the possibility of change in a simple manner alone by the use of disks having various cone angles, the angle between the working surface and the infeed direction of the tool without requiring a modifying of the tool holder. This can be useful particularly when this angle is supposed to be enlarged in order to permit greater diameter reductions. Finally, it is possible to approximate the disks at least over a portion of their axial height to the shape of a hyperboloid of one sheet, whereby, however, in practice, only slight inward curvatures of the disk surface are used. However, such a slight concave curvature is already sufficient to better guide the tube wall in tube-shaped workpieces which is important in very thin-walled tubes.

The tool holder which carries the disks can itself be constructed as desired. Independent from its structure in detail the invention suggests that the disks are to be inserted into recesses in the tool holder and are secured on the tool holder by a clamping bolt which extends through the axis thereof. The recesses take care of the exact fit of the disks on the tool holder, while the fastening with only one central clamping bolt does not only permit a quick exchange of the disks but also makes it possible to repeatedly rotate the disks after their working surface is worn in the respective position.

Figure 2:
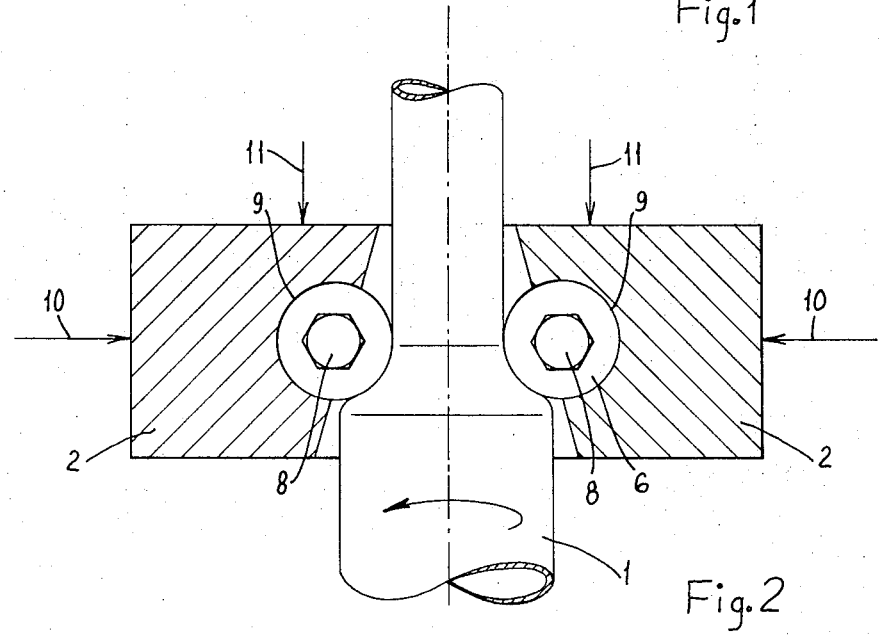

The invention will be described more in detail hereinafter in connection with one exemplary embodiment illustrated in the drawings, in which:

FIG. 1 is a front cross-sectional view, taken along a line transverse of the workpiece axis, of a device of the invention with an only schematically illustrated infeed mechanism for the tools, FIG. 2 is a cross-sectional view of the device of FIG. 1 along the cross-sectional line A–B.

Both figures of the drawing illustrate schematically a device for the conical tapering of elongated workpieces in the exemplary embodiment of a tube 1. For this purpose, the two tool holders 2, which in the exemplary embodiment are of a platelike shape, move against one another in the direction of the arrows 10 which indicate the infeed direction. The tool holders each hold tools in the form of disks 6. The tool holders 2 are each secured to a movable carriage 3 mounted on schematically illustrated rollers 4 which are guided on a support 5 movable in the longitudinal direction of the workpiece 1 parallel to the axis thereof. The infeed of the tools 6 is done during a continuous rotation of the workpiece 1 about the longitudinal axis thereof and during a simultaneous advance of the tool arrangement in the axial direction (arrow 11). Each tool holder 2 has two tools which in the exemplary embodiment are constructed as cylindrical disks 6. The disks 6 are secured stationarily and nonmovably on the tool holder 2 so that the disk axes lie in a plane which is at a right angle to the workpiece axis, which plane corresponds to the plane of the drawing in FIG. 1. The intersection of the plane with the surface of the disks 6 forms an angle $\alpha$ with the infeed direction 10 as illustrated in FIG. 1. The points of engagement 7 of the working surface of the disks 6 with the workpiece 1, which working surface is formed by the peripheral surface of each disk 6, lie in the aforesaid plane. The disks 6 are each positioned in recesses 9 of the tool holder 2 and are secured by means of one clamping bolt 8 each. The four working points 7, (FIG. 1) at which the disks 6 engage the workpiece 1 lie in one common plane which is perpendicular to the workpiece axis. After the working surface in the points of engagement 7 are worn, the disks 6 can be repeatedly rotated to different locations. Further, a replacement of the disks 6 is very easy because only the clamping bolts must be loosened. Thus it is possible by suitably choosing the tolerance of the disk diameters to produce high precision tools which during the conical tapering of thinwalled tubes permit great diameter reductions during one cyclic operation of the tools with the least amount of stress on the workpiece.

As is illustrated in FIG. 1 at 14 in connection with the example of one of the disks 6, the disks may differ from the cylindrical shape and may be approximately like a hyperboloid or, as indicated at 13, may correspond to a truncated cone. The first-mentioned case has the advantage that tube wall is better guided by the concave curvature of the disks 6. This is important in very thin-walled tubes. The special shape of a truncated cone is to be utilized to facilitate with as little effort as possible an enlargement, for example of the angle between the working surfaces which rest on the workpiece periphery as a tangent and the infeed direction without necessitating a changing of the tool holder in order to arrive at greater diameter reductions.

Soft tubes of AlZnMgCu having the dimensions of 13.0 mm. in diameter and a wall thickness of 0.8 mm. were tapered conically to a smallest diameter of 3.0 mm. during one cyclic operation of the tools of the type disclosed above. The cyclindrical disks 6 had hereby a diameter of 20 mm. and a thickness of 8.0 mm. The infeed angle $\alpha$ was 45°. After this infeed angle $\alpha$ was increased to 50°, it was possible to taper conically with the same disk dimensions tubes having an initial diameter of even 16.0 mm. to a final diameter of again 8.0 mm.

The embodiments of the invention in which an exclusive property or privilege is claimed are defined as follows:

1. A device for the conical tapering of a continuously rotating elongated workpiece rotatable about its longitudinal axis and having a circular cross section, said device having at least two radially feedable tools simultaneously advanced in axial direction and arranged in one plane at a right angle to the workpiece axis, at least one of said tools consisting of two working surfaces which are fixedly connected with one another, which working surfaces define an angle with the infeed direction of the tools, comprising the improvement wherein the two working surfaces are each formed by the surface of a disk which is circular in cross section and both disks are secured stationarily and nonmovably on a tool holder in such a manner that the axes of both disks lie in the plane which is at a right angle to the workpiece axis, whereby from the respective inclination of the intersection of this plane with the surface of each disk results the angle of the working surface with respect to the infeed direction of the tool.

2. A device according to claim 1, wherein two disks for forming the working surfaces are provided on both tools.

3. A device according to claim 1, wherein the disks have a cylindrical shape with equal diameters.

4. A device according to claim 1, wherein the disks have the shape of a truncated cone.

5. A device according to claim 1, wherein the disks are at least over a portion of their axial height approximate to the shape of a hyperboloid of one sheet.

6. A device according to claim 1, wherein the disks are inserted into recesses of the tool holder and are each held on the tool holder by a clamp bolt which extends through it along its axis.

* * * * *